United States Patent [19]

Uematsu et al.

[11] Patent Number: 5,208,114
[45] Date of Patent: May 4, 1993

[54] POWER GENERATION SYSTEM USING MOLTEN CARBONATE FUEL CELLS

[75] Inventors: Hiroyoshi Uematsu, Yokohama; Satoshi Hatori, Ibaraki, both of Japan

[73] Assignee: Ishikawajima-Harima Heavy Industries Co., Ltd., Tokyo, Japan

[21] Appl. No.: 644,927

[22] Filed: Jan. 23, 1991

[51] Int. Cl.$^5$ .................................. H01M 8/04
[52] U.S. Cl. ............................... 429/20; 429/26
[58] Field of Search ........................... 429/20, 26

[56] References Cited

U.S. PATENT DOCUMENTS

| | | | |
|---|---|---|---|
| 3,655,448 | 4/1972 | Setzer | 429/20 |
| 3,982,962 | 9/1976 | Bloomfield | 429/20 X |
| 4,128,700 | 12/1978 | Sederquist | 429/20 X |
| 4,678,723 | 7/1987 | Wertheim | 429/20 X |
| 4,738,903 | 4/1988 | Garow et al. | 429/20 X |
| 4,743,517 | 5/1988 | Cohen et al. | 429/20 X |

FOREIGN PATENT DOCUMENTS

| | | |
|---|---|---|
| 0246649 | 11/1987 | European Pat. Off. . |
| 0376219 | 7/1990 | European Pat. Off. . |
| 61-066375 | 8/1986 | Japan . |
| 62-017002 | 6/1987 | Japan . |
| 63-048774 | 7/1988 | Japan . |
| 01059778 | 6/1989 | Japan . |
| 01128364 | 8/1989 | Japan . |

OTHER PUBLICATIONS

European Search Report ED 9110 0702, Oct. 10, 1991.
Patent Abstracts of Japan vol. 12, No. 265 (E-637)(3112) Jul. 23, 1988.
Patent Abstracts of Japan vol. 13, No. 374 (E-808)(3722) Aug. 18, 1989.
Patent Abstracts of Japan vol. 13, No. 268 (E-775)(3616) Jun. 20, 1989.
Patent Abstracts of Japan vol. 11, No. 193 (C-430)(2640) Jun. 20, 1987.

*Primary Examiner*—Stephen Kalafut
*Attorney, Agent, or Firm*—Trexler, Bushenll, Giangiorgi & Blackstone, Ltd.

[57] ABSTRACT

A reformer includes a reforming chamber for reforming raw material and a heating chamber for heating the reforming chamber. Exhaust gas from a cathode chamber of a fuel cell is directly introduced to the heating chamber such that the exhaust gas is combusted, or the exhaust gas from the cathode chamber is introduced to a catalyst combustor together with exhaust gas discharged from the anode chamber such that these gases undergo combustion. Combustion exhaust gas is introduced to the heating chamber and sensible heat of the cathode exhaust gas is effectively used as heat source for a reforming reaction in the reforming chamber.

47 Claims, 8 Drawing Sheets

POWER GENERATION SYSTEM USING MOLTEN CARBONATE FUEL CELLS

BACKGROUND OF THE INVENTION

1. Technical Field

The present invention relates to a power generation system for causing a reaction of anode gas with cathode gas in a fuel cell for power generation. More particularly, the present invention relates to a power generation system using molten carbonate fuel cells, in which sensible heat of cathode exhaust gas is utilized as part of heat source for a reformer when fuel gas is reformed into anode gas.

2. Background Art

A molten carbonate fuel cell includes a plurality of cell elements stacked with separator plates being interposed between the cell elements. Each cell element includes an electrolyte plate (a porous plate soaked with molten carbonate), a cathode (oxygen electrode) and an anode (fuel electrode). The electrolyte plate is sandwiched by these electrodes. In the fuel cell, cathode passages and anode passages are formed to respectively feed anode gas to an anode chamber and cathode gas to a cathode to perform power generation.

A conventional molten carbonate fuel cell is illustrated in FIG. 15 of the accompanying drawings. In FIG. 15, "I" indicates a fuel cell, and a cathode chamber 2 feeds cathode gas CG to a cathode and an anode chamber 3 feeds anode gas AG to an anode. Numeral 10 designates a reformer which reforms fuel gas such as natural gas. The reformer 10 includes a combustion chamber 10a and a reforming reaction tube 10b extending through the combustion chamber 10a.

First, feeding of cathode gas to the cathode chamber 2 of the fuel cell I will be described. Air A is pressurized by a compressor 4, driven by gas G then cooled by a cooling device 5 and compressed again by another compressor 6. After that, the air is preheated by an air preheater 7 and fed into a cathode chamber 2 through a line 8 with exhaust gas from the combustion chamber 10a of the reformer 10 as well as cathode recirculation gas from a recirculation line 31. Also, part of the air preheated by the air preheater 7 is fed to the combustion chamber 10a of the reformer 10 through a line 9. Cathode exhaust gas discharged from the cathode chamber 2 is not only recirculated to the cathode chamber 2 via the recirculation line 31 but also introduced to a turbine 12 through a line 11 and then expelled to atmosphere via the air preheater 7 and a water heater 21.

Next, the anode gas fed to the anode chamber 3 will be described. Natural gas NG passes through a preheater 14 and a desulfurizer 25 and then enters the reforming reaction tube 10b of the reformer 10 with steam supplied from a steam line 32. Natural gas is reformed in the reforming tube 10b to become the anode gas and then introduced to the anode chamber 3. Anode exhaust gas from the anode chamber 3 is cooled through a heat exchanger 13 and introduced to a cooling device 16 via the preheater 14 and the vaporizer 15. In the cooling device 16, the anode exhaust gas is condensed and the water thereof is separated from gas by a gas-liquid separator 17. Separated gas is sent to the heat exchanger 13 via the line 19 by means of the blower 18 driven by motor m and sent to the combustion chamber 10a of the reformer 10 in which unreacted $H_2$ and $CO$ are combusted with air fed from the line 9 to maintain a reforming temperature of the reforming tube 10b. On the other hand, water separated by the gas-liquid separator 17 flows through a line 32 to be compressed by a pump 20, to be heated by the water heater 21 and to be mixed with natural gas coming from the desulfurizer 25 through the line 22, the vaporizer 15 and the steam line 32. The the water is finally recirculated to the anode chamber 3.

Combustion exhaust gas of the combustion chamber 10a is fed through the line 24 to the cathode chamber 2 as the cathode gas.

In the power generation system of FIG. 15, the temperature maintenance of the reforming reaction tube 10b of the reformer 10 is influenced by an amount of heat of air fed into the combustion chamber 10a, an amount of heat of the anode exhaust gas which has been separated from the water and combustion heat of these gases. However, the anode exhaust gas is cooled at the water-gas separation process so that it is necessary to lower a fuel utilization factor in order to raise an amount of combustible gas among the anode exhaust gas and to increase the combustion heat. An example is illustrated in FIG. 17, in which $T_i$ is assigned to an entrance temperature of the reformed gas of the reaction tube 10b, $T_o$ is assigned to an exit temperature of the same, $T_1$ to an entrance temperature of the combustion chamber 10b, $T_2$ to the anode exhaust gas temperature, $T_3$ to a combustion temperature after-the-combustion-temperature), $T_4$ to a temperature at the exit (this temperature is lower than $T_3$ due to the heating of the reforming section). In this case, the exit temperature $T_4$ of the exhaust gas from the combustion chamber 10a is higher than the air temperature $T_1$ at the entrance and the anode exhaust gas temperature $T_2$. Therefore, an amount of heat required for the combustion includes heat for the reformation and heat for raising the air and the anode exhaust gas temperature to the exit temperature $T_4$. In other words, some heat is wasted to raise the air temperature and the anode exhaust gas temperature. The same symbols A, G, M, AG and CG are utilized in the other figures of drawings herein with the same meanings as given hereinabove.

Referring to FIG. 16, there has been proposed a power generation system which maintains the reforming temperature of the reformer 28 by the sensible heat of the anode exhaust gas.

In FIG. 16, the natural gas NG is pressurized by the blower 26 and introduced to the preheater 26, the desulfurizer 25 and the reformer 28 (The reformer 28 has the reforming chamber only). After that, the natural gas is sent to the preheater 27 and the anode chamber 3 by the blower 29. Part of the anode exhaust gas from the anode chamber 3 is mixed with the natural gas and then introduced to the reformer 28 as the heat source for the reformer 28 whereas the remainder is introduced to the catalyst combustor 30.

Next, the cathode gas to be supplied to the cathode chamber 2 will be explained. The air is compressed by the compressor 4, cooled by the cooling device 5 and preheated by the air preheater 7. Then, the air is led to the catalyst combustor 30 through the line 8 and used to combust the combusible components among the anode exhaust gas fed into the catalyst combustor 30. Thereafter, the air is sent to the cathode chamber 2. The cathode exhaust gas from the cathode chamber 2 is partially recirculated to the cathode chamber 2 via the recirculation line 31 and partially introduced to the turbine 12 via the line 11 to be expelled to the atmosphere via the air preheater 7.

In the power generation system of FIG. 16, since the reforming temperature of the reformer 28 is maintained by the sensible heat of the anode exhaust gas, it is necessary that a large amount of anode exhaust gas is fed to the reformer 28. However, as a amount of anode exhaust gas to be supplied increases, the concentration of the fuel gas ($H_2$ and CO) among the anode gas becomes leaner which results in deterioration of fuel performances and drop of power generation efficiency. In addition, since the reforming temperature of the reformer 28 becomes lower than the anode exhaust gas temperature at the anode chamber 3 exit, which is the fuel cell system operation temperature, the reforming ratio cannot be set high.

SUMMARY OF THE INVENTION

An object of the present invention is to provide a power generation system in which the heat source for maintaining the reforming reaction temperature of the reformer, i.e., the sensible heat of the anode exhaust gas or the cathode exhaust gas is effectively used in the reforming reaction.

Another object of the present invention is to provide a power generation system which mainly utilizes the sensible heat of the cathode exhaust gas as the heat source for the maintaining the reforming reaction.

According to one aspect of the present invention, there is provided a power generation system which comprises: molten carbonate fuel cells, each fuel cell having an anode chamber and a cathode chamber and power generation being caused by the anode gas supplied to the anode chamber and the cathode gas supplied to the cathode chamber; a reformer having a reforming section and a heating section, raw material such as natural gas being reformed to the anode gas by the reforming section and the reforming section being heated by the heating section; means for feeding raw material to be reformed, to the reforming section of the reformer; means for feeding the anode gas, which is the gas reformed by the reformer, into the anode chamber; means for feeding the cathode gas into the cathode chamber, the cathode gas including air; an anode exhaust gas line for discharging the anode exhaust gas from the anode chamber; and a cathode exhaust gas line for discharging the cathode exhaust gas from the cathode chamber; c h a r a c t e r i z e d in that the reformer has a reforming chamber for reforming the raw material and a heating chamber for heating the reforming chamber, and the system further comprises: a catalyst combustor for combusting combusible components among the anode exhaust gas, the combustor being connected with the anode exhaust gasline and the cathode exhaust gas line; a line for connecting an exit of the catalyst combustor with the heating chamber of the reformer for feeding the exhaust gas of the catalyst combustor to the heating chamber.

DESCRIPTION OF THE PREFERRED EMBODIMENTS

Preferred embodiments of the present invention will be described with reference to the accompanying drawings.

Figure 1:
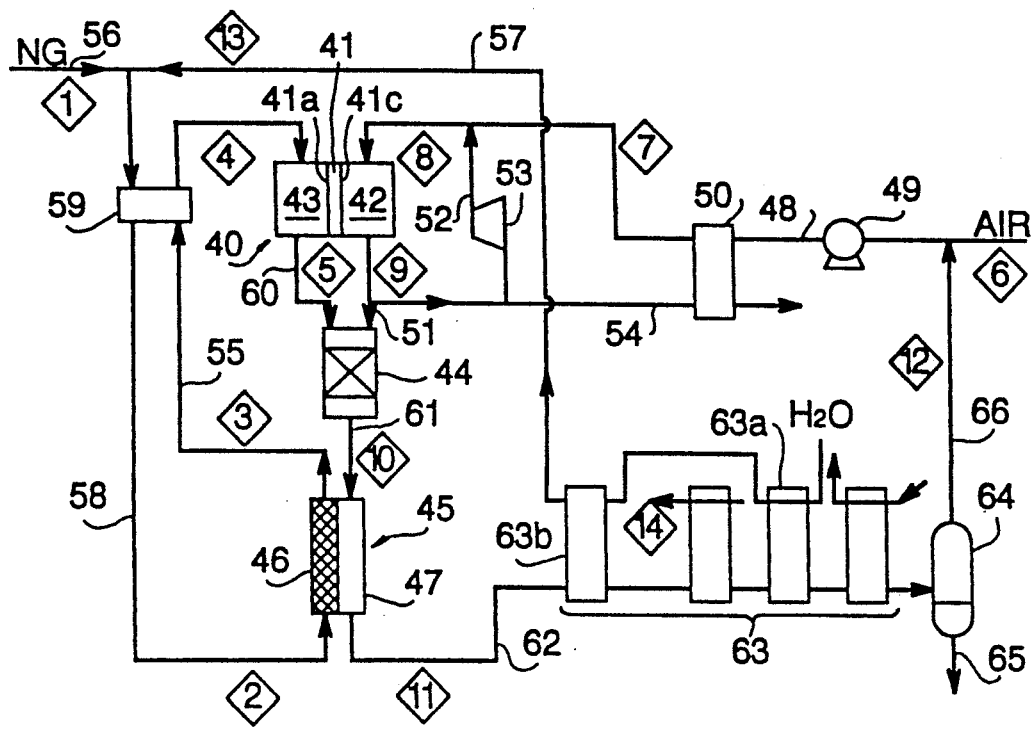
FIG. 1 is a system diagram of a first embodiment of the present invention.

Referring first to FIG. 1, numeral 40 designates a fuel cell arrangement. The fuel cell arrangement 40 includes a molten carbonate fuel cell 41. The fuel cell 41 is sandwiched by an anode electrode and a cathode electrode. The fuel cell 41 is provided with a cathode chamber 42 at its cathode 41c side and an anode chamber 43 at its anode side 41a. The fuel cell arrangement 41 is depicted in an illustrative manner, but actually includes a plurality of fuel cells 41 stacked via separator plates (not shown). The separator plates form anode gas passages and cathode gas passages, and anode gas and cathode gas are respectively fed to the anode 41a and the cathode 41c through the respective passages. Numeral 44 designates a catalyst combustor which combusts combustible components among the anode exhaust gas. Numeral 45 designates a reformer which includes reforming chambers 46 and heating chambers 47. The reforming chambers 46 and the heating chambers 47 are closely stacked one after another. Reforming catalyst is placed in each reforming chamber 46. The heating chambers 47 are used to heat the reforming chambers 46.

An air feed line 48 is connected to an entrance of the cathode chamber 42, and the blower 49 and the air preheater 50 are connected to the air feed line 48. A cathode exhaust gas line 51 is connected to the exit of the cathode chamber 42, and the catalyst combustor 44 is connected to the cathode exhaust gas line 51. A cathode exhaust gas recirculation line 52 is connected with the cathode exhaust gas line 51. A blower 53 is provided on the cathode exhaust gas recirculation line 53. The cathode exhaust gas is introduced to the cathode chamber 42 through the air feed line 48 by the blower 53. A cathode exhaust gas utilization line 54 is also connected to the cathode exhaust gas recirculation line 52 for feeding the cathode exhaust gas to the air preheater 50.

The entrance of the anode chamber 43 and the exit of the reforming chamber 46 of the reformer 45 are connected with each other by the anode gas feed line 55. Natural gas and steam are supplied as the raw material to the entrance of the reforming chamber 46 of the reformer 45. The feed line 56 for the natural gas NG merges with the steam feed line 57 and the raw material, which includes natural gas and steam, is supplied to the reforming chamber 46 through the line 58. A heat exchanger 59 is provided on the line 58 and the anode gas feed line 55. The heat exchanger 59 is used for the heat exchange between the raw material and the reformed gas.

The exit of the anode chamber 43 is connected with the catalyst combustor 44 via the anode exhaust gas line 60. The exhaust gas exit of the catalyst combustor 44 and the heating chamber 47 of the reformer 45 are connected with each other via a sensible heat utilization line 61. The exhaust gas line 62 is connected with the exit of the heating chamber 47. A group of various heat exchangers 63 and a gas-liquid separator 64 are connected with the line 62, respectively. Water separated in the gas-liquid separator 64 is dehydrated by a line 65, and the gases containing $CO_2$ is led by a line 66 to the air feed line 48 which is located on the inlet side of the blower 49 so that $CO_2$ is fed to the cathode chamber 42 with the air.

The steam line 57 extends in the system in a manner such that the water flows through the heat exchangers 63a and 63b of the above-mentioned group of heat exchangers 63. Accordingly, the water is heated to vapor or steam of a predetermined temperature before merging with the natural gas line 56.

In the foregoing description, the air and $CO_2$ from the air line 48 and the cathode exhaust gas from the cathode exhaust gas recirculation line are fed to the cathode chamber 42 of the fuel cell arrangement 40 whereas the anode gas ($H_2$, CO, $CO_2$, $H_2O$ and others), which is the reformed gas reformed in the reforming chamber 46 of the reformer 45, is fed to the anode chamber 43 through the line 55 so that the reaction of the anode gas and the cathode gas takes place in the cell 41 to generate electricity. Exhaust gases from the anode chamber 43 and the cathode chamber 42 are respectively introduced to the catalyst combustor 44 via the lines 60 and 51 and the combusible components among the anode exhaust gas is combusted with the unreacted oxygen among the cathode exhaust gas. By feeding the anode exhaust gas and the cathode exhaust gas into the catalyst combustor 44, the anode chamber 43 and the cathode chamber 42 are comminicated with each other via the catalyst combustor 44 so that the anode chamber 43 and the cathode chamber 42 become equal to each other in pressure. Therefore, the differential presure control between the anode electrode and the cathode electrode becomes significantly easy. The exhaust gas from the catalyst combustor 44 is then supplied to the heating chamber 47 of the reformer 45 via the sensible heat utilization line 61. As a result, heat required for the reformation of the raw material gas in the reforming chamber 46 is provided by the sensible heat of the exhaust gas. The gas discharged from the heating chamber 47 is introduced to the heat exchanger 63a and 63b through the exhaust gas line 62. The exhaust gas is used to generate steam in the heat exchanger 63a and used to further heat the steam in the heat exchanger 63b.

The relation among exit gas temperature of the reforming chamber 46 of the reformer 45, the exit gas temperature of the cathode and anode chambers 42 and 43 and the exit gas temperature of the heating chamber 47 will be explained with FIG. 5.

Figure 5:
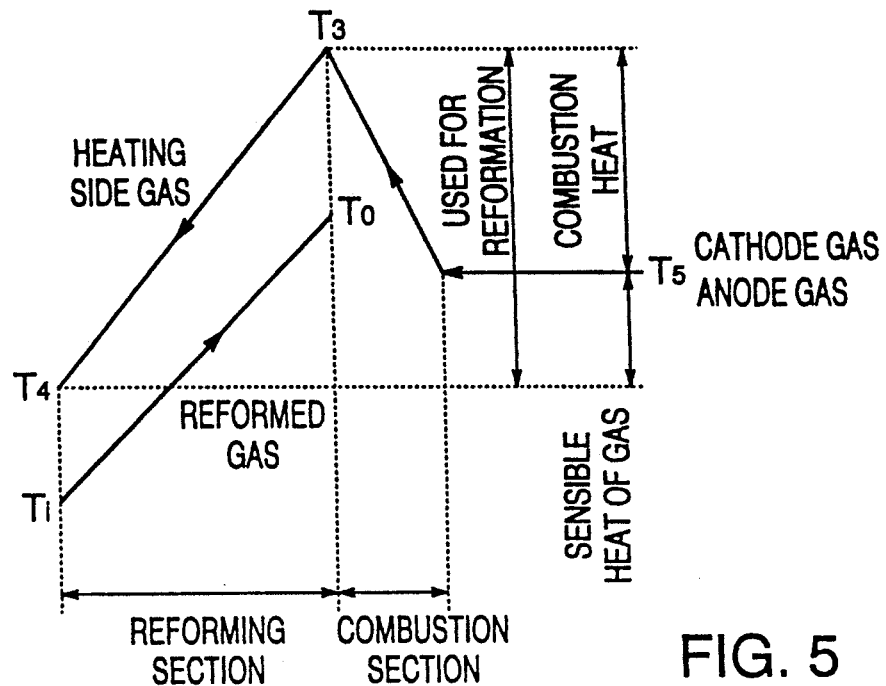
FIG. 5 shows reforming temperature patterns of the first embodiment.

In FIG. 5, $T_5$ are assigned to the exit temperature of the cathode 42 and that of the anode chamber 43. The anode exhaust gas and the cathode exhaust gas are brought into the catalyst combustor 44 with the temperature of $T_5$ and combusted in the combustor 44 whereby its temperature is raised to $T_3$. After that, the gases enter the heating chamber 47 to give the heat (the heat required for the reformation) to the reforming chamber 46. In other words, the gases gives off their sensible heat and the temperature thereof drops to $T_4$ at the exit. On the other hand, Ti is assigned to the entrance temperature of the raw material gas to be supplied to the reforming chamber 46 and To is assigned to the exit temperature of the same. As seen from FIG. 5, the exit temperature of the heating chamber 47 is higher than the entrance temperature Ti of the raw material gas and considerably lower than the anode and cathode exhaust gas temperature $T_5$. This means that the sensible heat of the anode exhaust gas and the cathode exhaust gas, i.e., the sensible heat corresponding to the temperature drop of $T_5 - T_4$ is utilized to heat the raw material gas, in addition to the heat ($T_3 - T_5$) combusted in the catalyst combustor 44.

Figure 15:
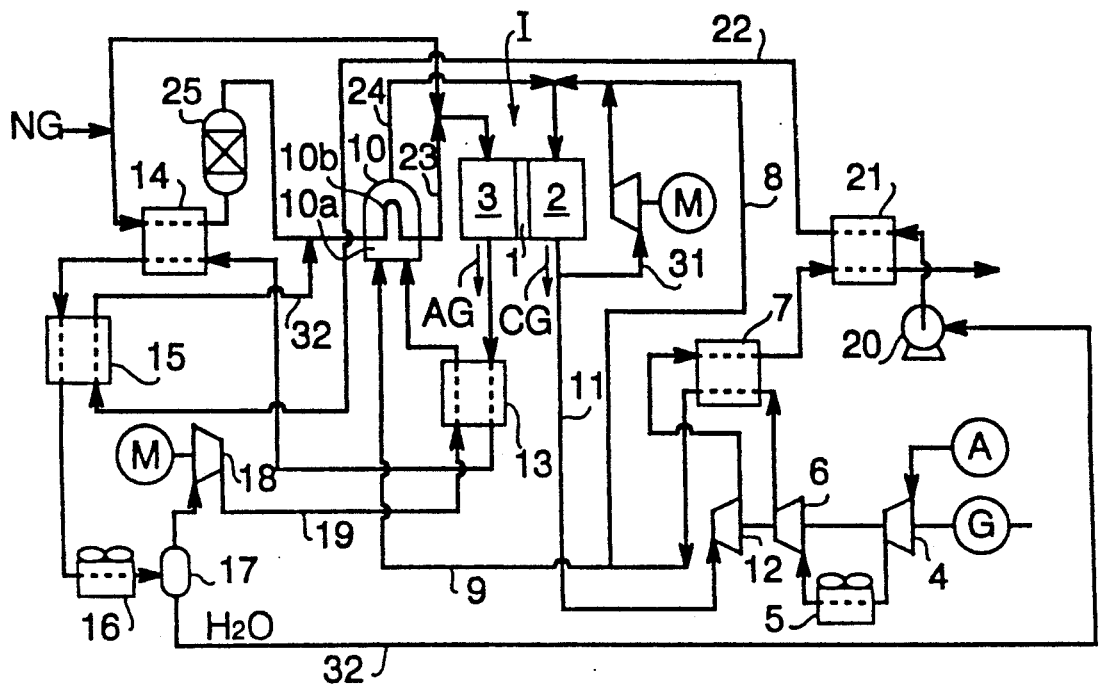
FIG. 15 illustrates a conventional power generation system using molten carbonate fuel cells.
Figure 16:
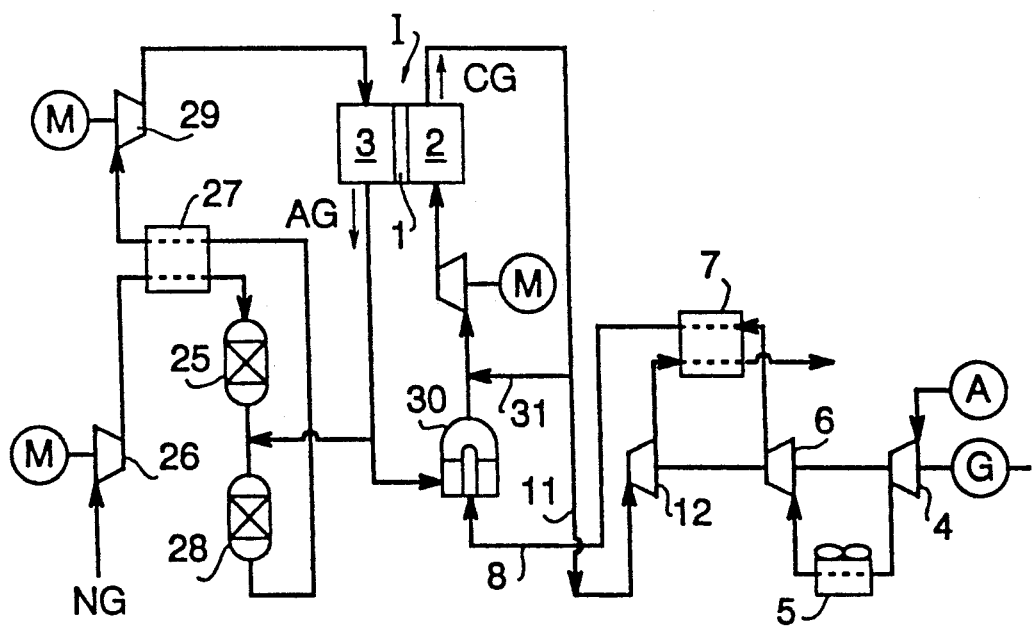
FIG. 16 illustrates another conventional power generation system using molten carbonate fuel cells.
Figure 17:
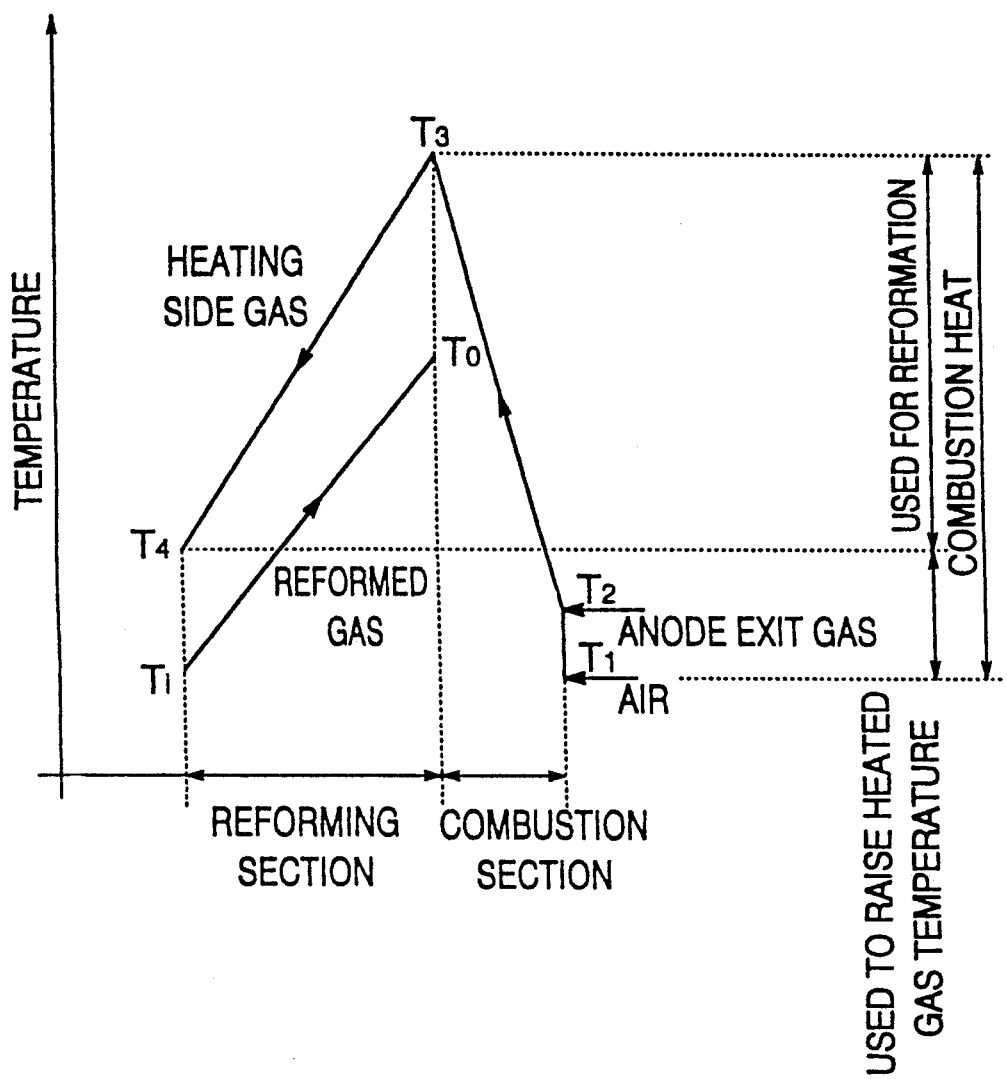
FIG. 17 illustrates reforming temperature patterns of the arrangement of FIG. 15.

With FIG. 5 being compared with FIG. 17 which shows the temperature variations at the entrance and the exit of the reformer of the conventional system illustrated in FIG. 15, followings become is clear: In the conventional system, the anode exit gas is cooled due to water removal and heated again before introduced to the catalys combustor 10. The anode exit gas is mixed with the low temperature air in the catalyst combustor 10. Therefore, these temperatures $T_1$ and $T_2$ become lower than the exit temperature $T_4$ of the combustion chamber 10a of the reformer 10. Consequently, additional heat is required in the combustion chamber 10a to raise the air temperature $T_1$ and the anode exhaust gas temperature $T_2$ (Part of heat of the anode exhaust gas has been used before.) to the exit temperature of $T_4$. Therefore, a corresponding amount of natural gas should be increased. In the first embodiment of the present invention, on the other hand, the high temperature anode exhaust gas and the high temperature cathode exhaust gas are directly introduced to the catalyst combustor 44 and combusted therein. Accordingly, the entire combustion heat can be used to maintain the temperature of the reforming reaction. In addition, the sensible heat of the anode exhaust gas and the cathode exhaust gas can be used to heat the reforming chamber 46. Furthermore, the exhaust gas entering the heating chamber 46 from the catalyst combustor 44 is the mixture of the anode exhaust gas and the cathode exhaust gas. Thus, the flow rate of the gas to be introduced to the heating chamber 47 can be set to an arbitrary value with the power generation efficiency of the fuel cell arrangement 40 being maintained at a high level by appropriately adjusting an amount or flow rate of the cathode exhaust gas discharged from the line 54. Tables below show temperature, pressure and flow rate of the respective gases picked up at locations ① to ⑭ of the system of FIG. 1.

TABLE I

| & M.W. | NG ① | | REFORMER ENTRANCE ② | | REFORMER EXIT ③ | | ANODE ENTRANCE ④ | | ANODE EXIT ⑤ | |
|---|---|---|---|---|---|---|---|---|---|---|
| FLUID STATE | G | | G | | G | | G | | G | |
| TEMPERATURE [°C.] | 15 | | 449 | | 750 | | 570 | | 680 | |
| PRESSURE [Kg/cm² A] | 1.24 | | 1.22 | | 1.18 | | 1.16 | | 1.14 | |
| AV. MOLECULAR. WT. | | | | | | | | | | |
| | Kg-mol/Hr | Mol.Fr. | Kg-mol/Hr | Mol.Fr. | Kg-mol/Hr | Mol.Fr. | Kg-mol/Hr | Mol.Fr. | Kg-mol/Hr | Mol.Fr. |
| $H_2$ | | | | | 30.3940 | | 30.3940 | | 2.8988 | |
| CO | | | | | 5.8356 | | 5.8356 | | 1.6299 | |
| $CO_2$ | | | | | 3.6198 | | 3.6198 | | 39.5263 | |
| $O_2$ | | | | | | | | | | |
| $N_2$ | | | | | | | | | | |
| Ar | | | | | | | | | | |
| $CH_4$ | 7.056 | | 7.056 | | 0.1366 | | 0.1366 | | 0.1366 | |
| $C_2H_6$ | 0.416 | | 0.416 | | | | | | | |
| $C_3H_8$ | 0.408 | | 0.408 | | | | | | | |
| $\eta$-$C_4H_{10}$ | 0.120 | | 0.120 | | | | | | | |
| $H_2O$ (V) | | | 28.776 | | 15.7008 | | 15.7008 | | 43.1960 | |
| $H_2O$ (L) | | | | | | | | | | |
| TOTAL | 8.0 | | 36.776 | | 55.6869 | | 55.6869 | | 87.3876 | |
| TOTAL Kg/Hr | | | | | | | | | | |
| TOTAL M³/Hr OR (GPM) | | | | | | | | | | |
| LIQUID S.G. @ O.T. OR (°API) | | | | | | | | | | |
| LIQUID VISC. @ O.T. [CST] | | | | | | | | | | |
| ENTHALPY [MM-Kcal/Hr] | | | | | | | | | | |
| Z | | | | | | | | | | |

TABLE II

| & M.W. | AIR ⑥ | | AIR PRE-HEATER EXIT ⑦ | | CATHODE ENTRANCE ⑧ | | CATHODE EXIT ⑨ | | REFORMER ENTRANCE ⑩ | |
|---|---|---|---|---|---|---|---|---|---|---|
| FLUID STATE | G | | G | | G | | G | | G | |
| TEMPERATURE [°C.] | 18 | | 334 | | 570 | | 680 | | 838 | |
| PRESSURE [Kg/cm² A] | 1.03 | | 1.16 | | 1.16 | | 1.14 | | 1.12 | |
| AV. MOLECULAR. WT. | | | | | | | | | | |
| | Kg-mol/Hr | Mol.Fr. | Kg-mol/Hr | Mol.Fr. | Kg-mol/Hr | Mol.Fr. | Kg-mol/Hr | Mol.Fr. | Kg-mol/Hr | Mol.Fr. |
| $H_2$ | | | | | | | | | | |
| CO | | | | | | | | | | |
| $CO_2$ | 0.0422 | | 48.5606 | | 91.9142 | | 60.2134 | | 48.5184 | |
| $O_2$ | 29.0107 | | 34.4402 | | 82.2425 | | 66.3921 | | 5.4295 | |
| $N_2$ | 108.2524 | | 189.4416 | | 676.5762 | | 676.5762 | | 81.1892 | |
| Ar | 1.3078 | | 2.2887 | | 8.1738 | | 8.1738 | | 0.9809 | |
| $CH_4$ | | | | | | | | | | |
| $C_2H_6$ | | | | | | | | | | |
| $C_3H_8$ | | | | | | | | | | |
| $\eta$-$C_4H_{10}$ | | | | | | | | | | |
| $H_2O$ (V) | 2.0109 | | 20.9513 | | 74.8260 | | 74.8260 | | 55.3471 | |
| $H_2O$ (L) | | | | | | | | | | |
| TOTAL | 140.6240 | | 295.6821 | | 933.7324 | | 886.1809 | | 191.4651 | |
| TOTAL Kg/Hr | | | | | | | | | | |
| TOTAL M³/Hr OR (GPM) | | | | | | | | | | |
| LIQUID S.G. @ O.T. OR (°API) | | | | | | | | | | |
| LIQUID VISC. @ O.T. [CST] | | | | | | | | | | |
| ENTHALPY [MM-Kcal/Hr] | | | | | | | | | | |
| Z | | | | | | | | | | |

TABLE III

| | REFORMER EXIT ⑪ | | KO DRUM EXIT ⑫ | | STEAM SUPER-HEATER EXIT ⑬ | | STEAM ⑭ | | ◇ | |
|---|---|---|---|---|---|---|---|---|---|---|
| FLUID STATE | G | | G | | G | | G | | | |
| TEMPERATURE [°C.] | 515 | | 50 | | 300 | | 175 | | | |
| PRESSURE [Kg/cm² A] | 1.10 | | 1.03 | | 1.24 | | 9.03 | | | |
| AV. MOLECULAR. WT. | | | | | | | | | | |
| | Kg-mol/ | | Kg-mol/ | | Kg-mol/ | | Kg-mol/ | | Kg-mol/ | |

TABLE III-continued

| & M.W. | REFORMER EXIT ⟨11⟩ | | KO DRUM EXIT ⟨12⟩ | | STEAM SUPER-HEATER EXIT ⟨13⟩ | | STEAM ⟨14⟩ | | | |
|---|---|---|---|---|---|---|---|---|---|---|
|  | Hr | Mol.Fr. | Hr | Mol.Fr. | Hr | Mol.Fr. | Hr | Mol.Fr. | Hr | Mol.Fr. |
| $H_2$ |  |  |  |  |  |  |  |  |  |  |
| CO |  |  |  |  |  |  |  |  |  |  |
| $CO_2$ | 48.5184 |  | 48.5184 |  |  |  |  |  |  |  |
| $O_2$ | 5.4295 |  | 5.4295 |  |  |  |  |  |  |  |
| $N_2$ | 81.1892 |  | 81.1892 |  |  |  |  |  |  |  |
| Ar | 0.9809 |  | 0.9809 |  |  |  |  |  |  |  |
| $CH_4$ |  |  |  |  |  |  |  |  |  |  |
| $C_2H_6$ |  |  |  |  |  |  |  |  |  |  |
| $C_3H_8$ |  |  |  |  |  |  |  |  |  |  |
| $\eta\text{-}C_4H_{10}$ |  |  |  |  |  |  |  |  |  |  |
| $H_2O$ (V) | 55.3471 |  | 18.9404 |  | 28.7760 |  | 26.944 |  |  |  |
| $H_2O$ (L) |  |  |  |  |  |  |  |  |  |  |
| TOTAL | 191.4651 |  | 155.0584 |  | 28.7760 |  | 26.944 |  |  |  |
| TOTAL Kg/Hr |  |  |  |  |  |  |  |  |  |  |
| TOTAL $M^3$/Hr |  |  |  |  |  |  |  |  |  |  |
| OR (GPM) |  |  |  |  |  |  |  |  |  |  |
| LIQUID S.G. @ O.T. |  |  |  |  |  |  |  |  |  |  |
| OR (°API) |  |  |  |  |  |  |  |  |  |  |
| LIQUID VISC. @ O.T. [CST] |  |  |  |  |  |  |  |  |  |  |
| ENTHALPY [MM-Kcal/Hr] |  |  |  |  |  |  |  |  |  |  |
| Z |  |  |  |  |  |  |  |  |  |  |

Figure 2:
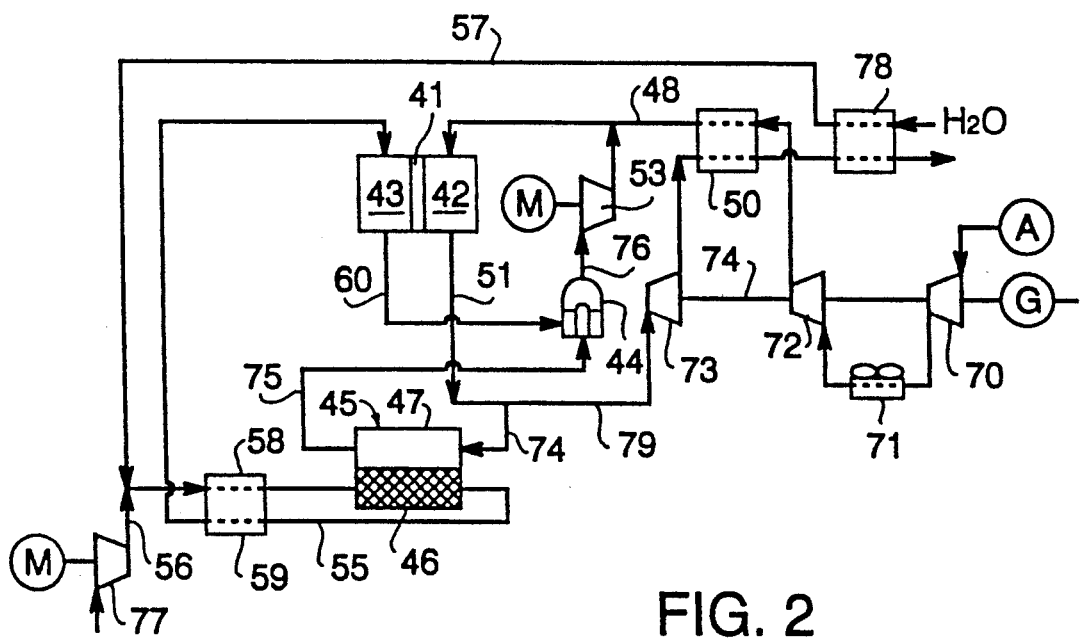
FIG. 2 is a system diagram of a second embodiment of the present invention.

FIG. 2 shows a second embodiment of the present invention. In this figure, same numerals are give to the same elements as those of FIG. 1 and the explanation of these elements will be omitted. Such is the case with following embodiments.

The air is pressurized by a low pressure side compressor 70, cooled by an intercooler 71, pressurized by a high pressure side compressor 72, introduced to the air preheater 50 and fed to the cathode chamber 42 through the air feed line 48. The cathode exhaust gas from the cathode chamber 42 is fed to a turbine 62 via a line 79 branched from the cathode exhaust gas line 51 and then used to drive a turbine 73. After that, the cathode exhaust gas preheats the air of the air feed line 48 in the air preheater 50 and further gives its heat to the water such that the water becomes steam in the vaporizer 48 before going out of the system. The turbine 73, the low pressure side compressor 70, the high pressure side compressor 72 and a generator are connected with each other by a shaft 174 and the compressors 70 and 72 and the generator are driven by the rotation of the turbine 73.

Branched from the cathode exhaust gas line 51 is a cathode exhaust gas sensible heat utilization line 74. The line 74 is used to feed the cathode exhaust gas to the heating chamber 47 of the reformer 45. The exit of the heating chamber 47 is connected to the combustor 44 via the line 75. The anode exhaust gas line 60 is also connected to the combustor 44. In the combustor 44, combusible components among the anode exhaust gas is combusted with the air contained in the cathode exhaust gas from the heating chamber 47. The combustion exhaust gas at the exit of the combustor 44 is led into the cathode exhaust gas recirculation line 76 connecting the combustor exit with the air feed line 48. A blower 53 is disposed on the line 76.

Downstream of the air preheater 50, there is provided a steam generator 78 and the water is heated to steam in the steam generator 78. The steam line 57 merges with the natural gas feed line 56 so that the steam and the natural gas NG are fed to the reforming chamber 46 through the line 58 as the raw material for the reformation. The natural gas feed line 56 is equipped with the blower 77 and the blower 77 pressurizes the natural gas. The blower 77 also raises the pressure of the anode gas from the reformer 46 to a value equal to the pressure of the cathode gas which has been compressed by the compressors 70 and 72.

The anode gas, which has undergone the reformation at the reforming chamber 46, is introduced to the anode gas feed line 55 to reach the heat exchanger 59. In the exchanger 59, heat exchange takes place between the anode gas and the raw material gas, and thereafter the anode gas is led to the anode chamber 43.

In the second embodiment, the heat required for the reforming reaction at the reforming chamber 46 entirely depends on the sensible heat of the cathode exhaust gas fed into the heating chamber 47 from the cathode exhaust gas sensible heat utilization line 74. The temperature of the cathode exhaust gas has been dropped at the fuel cell exit since the cathode exhaust gas gives its heat to the reforming reaction in the reformer 45, but its temperature is raised again by the heating in the catalyst combustor 44, before returning to the cathode chamber entrance. Since the cathode exhaust gas at the fuel cell exit reaches a considerably high temperature due to the fuel reaction and its flow rate is sufficiently high, the sensible heat of the cathode exhaust gas includes enough heat to maintain the reforming reaction.

Figure 6:
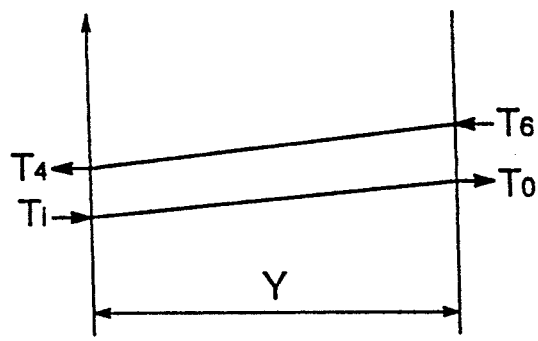
FIG. 6 shows reforming temperature patterns of the second embodiment.

Temperature variations at the entrance and the exit of the cathode exhaust gas and the raw material for the reformer 45 of the second embodiment is shown in FIG. 6. In the illustration, "Y" indicates the distance between the entrance and the exit of the heating chamber 47 and the reforming chamber 46, $T_6$ indicates the entrance temperature of the cathode exhaust gas entering the heating chamber 47, $T_4$ indicates the exit temperature of the same, Ti indicates the entrance temperature of the raw material gas entering the reforming chamber 46 and To indicates the exit temperature of the same.

Figure 3:
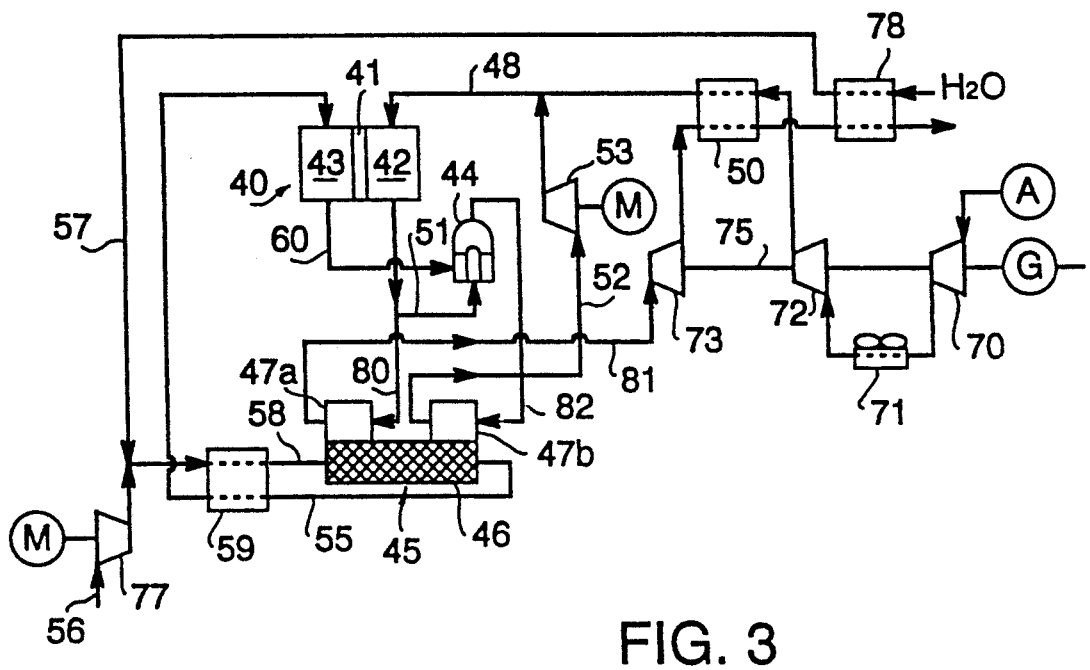
FIG. 3 is a system diagram of a third embodiment of the present invention.

FIG. 3 depicts a third embodiment of the present invention. The reformer 45 includes the reforming chamber 46 and two heating chambers 47a and 47b. These heating chambers 47a and 47b extend along the reforming chamber 46, but the first heating chamber 47a is separated from the second heating chamber 47b. The former heating chamber 47a extends from one end (entrance) of the reforming chamber 46 and the latter heating chamber 47b terminates at the other end (exit) of the reforming chamber 46. This arrangement is just for the illustrative purpose. In an actual system, the first heating chamber 47a and the second heating chamber 47b may be continuous and define in combination a separate gas passage.

The cathode exhasut gas line 51 of the cathode chamber 42 and the anode exhaust gas line 60 of the anode chamber 43 are connected to the catalyst combustor 44. A first sensible utilization line 80 is branched from the line 51 to introduce the cathode exhaust gas to the first heating chamber. The exit of the first heating chamber 47a is connected to the line 81 and the line 81 is connected to the turbine 73 to drive the turbine 73. The exit of the catalyst combustor 44 is connected to the second heating chamber 47b via a second sensible heat utilization line and the cathode exhaust gas recirculation line 52 is connected to the exit of the second heating chamber 47b. The cathode exhaust gas recirculation line 52 is also connected to the air feed line 48.

The way of vaporizing the water by the cathode exhaust gas and the feeding of the raw material gas (steam and natural gas) are same as those described with FIG. 2. Thus, the explanation will be omitted.

In the third embodiment, the heating chamber 47 is divided into the separate heating chambers 47a and 47b. Therefore, the raw material gas at the entrance side of the reforming chamber 46 is heated by the cathode exhaust gas coming from the first sensible heat utilization line 80 into the first heating chamber 47a whereas the raw material gas at the exit side of the reforming chamber is heated by the high temperature combustion exhaust gas coming from the exit of the catalyst combustor 44 into the second heating chamber 47b through the second sensible heat utilization line 82. In this embodiment, the reformer 45 is illustrated as one unit, but the reformer 45 may comprise two sections: a first reformer section having a first heating chamber 47a and a second reformer section having a second heating chamber 47b.

Figure 7:
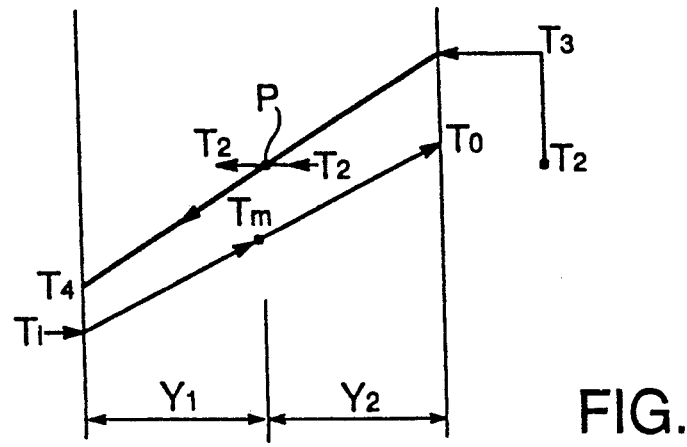
FIG. 7 shows reforming temperature patterns of the third embodiment.

FIG. 7 shows temperature changes of the entrance gas and the exit gas of the combustor 44 and the reformer 45 of the third embodiment. In this figure, $Y_1$ and $Y_2$ represent the distances between the entrances and the exits of the first heating chamber 47a and the second heating chamber 47b, respectively. "P" represents a contact point of the first heating chamber 47a and the second heating chamber 47b.

The anode exhaust gas of temperature $T_2$ and the cathode exhaust gas of temperature $T_2$ reach the entrance of the combustor 44 and these gases are combusted in the combustor 44. Upon the combustion, the temperature of the gases is raised to $T_3$ and fed to the second heating chamber 47b ($Y_2$). On the other hand, the cathode exhaust gas of temperature $T_2$ is fed to the first heating chamber 47a. The raw material gas whose temperature is Ti at the entrance of the reformer 46 is heated by the cathode exhaust gas in the first heating chamber 47a and its temperature is raised to Tm at the contacting point P as the reforming reaction proceeds. Then, the raw material gas is heated from Tm to To by the combustion exhaust gas in the second heating chamber 47b. After that, the raw material gas flows as the-anode-gas-to-be-gas.

Figure 4:
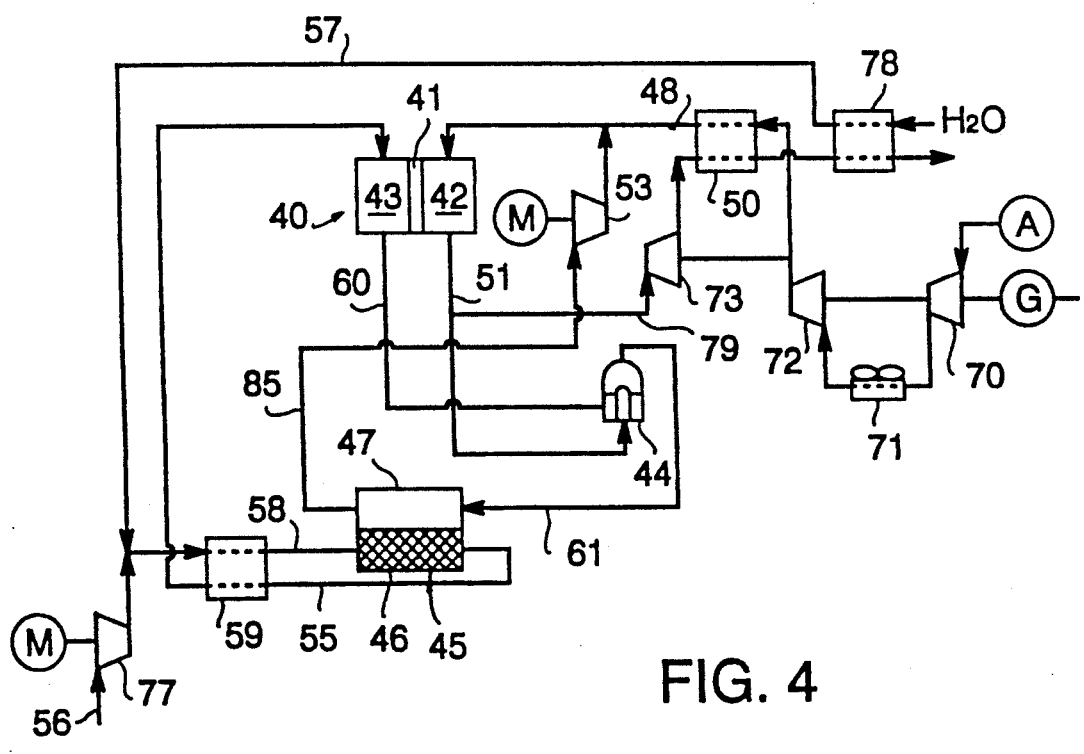
FIG. 4 is a system diagram of a fourth embodiment of the present invention.

FIG. 4 illustrates a fourth embodiment of the present invention. This embodiment is a modified version of the system of FIG. 2 (second embodiment).

The second embodiment shows an example that the combustion exhaust gas of the combustor 44 is recirculated to the cathode chamber 42. On the other hand, the fourth embodiment shows a following example: the cathode exhaust gas line 51 and the anode exhaust gas line 60 are connected with the combustor 44 and the combustion exhaust gas from the combustor 44 is fed to the heating chamber 47 via the sensible heat utilization line 61. The exhaust gas of the heating chamber 47 is fed to the air feed line 48 via a recirculation line 85 and the blower 53.

In the fourth embodiment, the entrance temperature change and the exit temperature change of the gases of the reformer 45 and the combustor 44 have the same patterns as the patterns of FIG. 5.

FIGS. 8 to 11 respectively depict fifth to the eighth embodiments. Specifically, the reforming chamber 46 of the reformer 45 is modified.

The reforming chamber 46 of FIGS. 8 to 11 includes a self sensible heat consumption section 46X and a main reforming section 46Y (or $46Y_1$ and $Y_2$). The section 46X has a self sensible heat consumption zone X. At the entrance of this zone X, the raw material gas and the anode exhaust gas are mixed with each other, and then the reforming reaction proceeds using the sensible heat of the anode exhaust gas. The main reforming section 46Y has a sensible heat absorption zone Y (or $Y_1$ and $Y_2$). The zone Y contacts the heating chamber 47 and is heated by the heating chamber 47.

Figure 8:
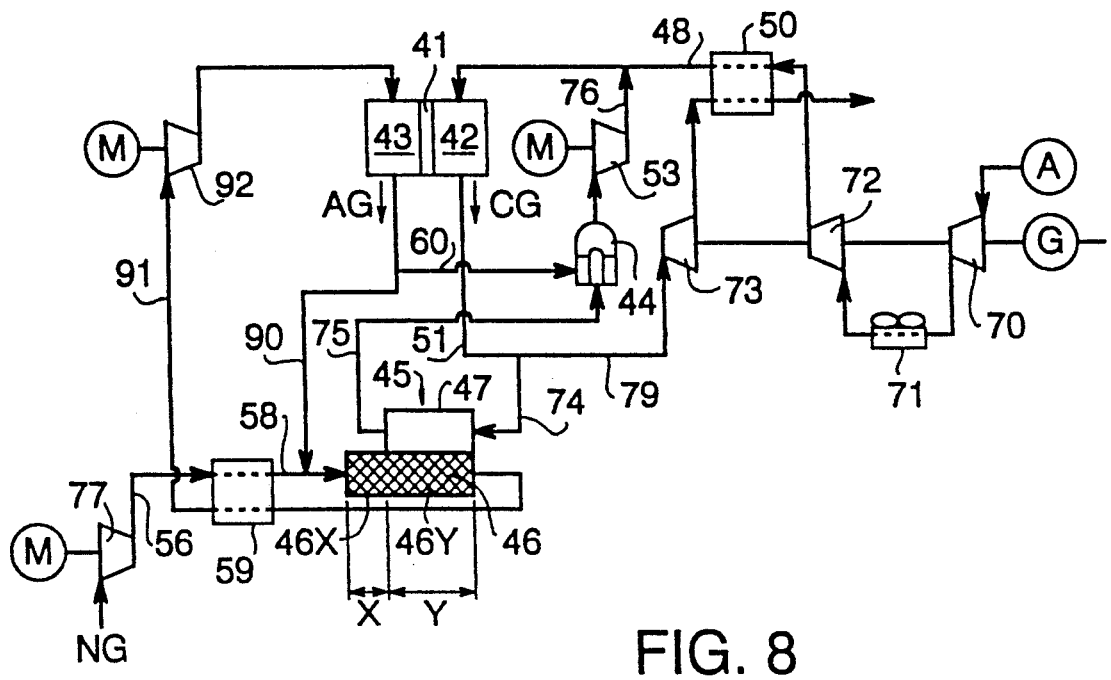
FIG. 8 shows reforming temperature patterns of the fifth embodiment.

The fifth embodiment of FIG. 8 shows a modified system of FIG. 2 and uses the above-described reformer 45. The way of feeding and discharging the cathode gas is same as the example of FIG. 2.

In other words, the air is pressurized by the relatively low pressure compressor 70, cooled by the intercooler 71, pressurized by the relatively high pressure compressor 72, introduced to the air preheater 50 and fed to the cathode chamber 42 through the air feed line 48. The cathode exhaust gas of the cathode chamber 42 is fed to the turbine 72 via the line 79 branched from the cathode exhaust gas line 51 and drives the turbine 73. Then, the cathode exhaust gas preheats the air in the air feed line 48 at the air preheater 50 before expelled to the atmosphere.

The cathode exhaust gas is not only fed to the turbine 73 but also fed to the heating chamber 47 of the reformer 45 through the cathode exhaust gas sensible heat utilization line 74 and then to the combustor 44 through the line 75. In the combustor 44, the combustible contents of the anode exhaust gas introduced from the anode exhaust gas line 60 is combusted with air contained in the cathode exhaust gas. The combustion exhaust gas of the combustor 44 is recirculated to the cathode chamber 42 through the cathode gas recirculation line 76, the blower 53 and the air line 48.

The way of feeding and discharging the anode gas of this example is same as the way of FIG. 2.

Figure 12:
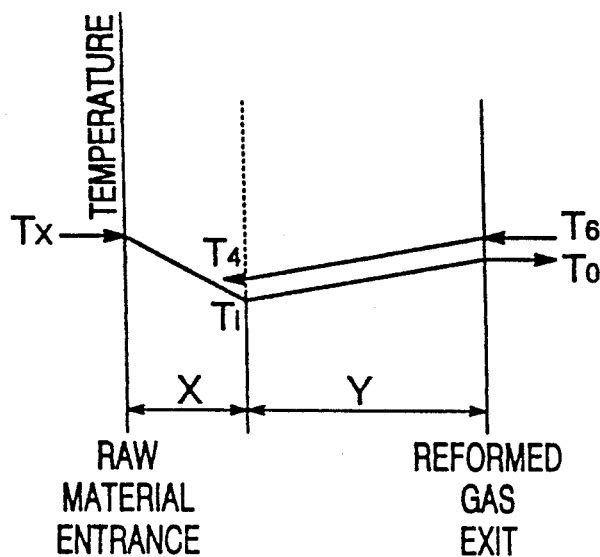
FIG. 12 shows reforming temperature patterns of the fifth embodiment of the present invention.

The natural gas NG is heated by the preheater 59 after it is pressurized by the blower 77. Then, the natural gas NG is fed to the reforming chamber 46. An anode exhaust gas recirculation line 90 branched from the anode exhaust gas line 60 is connected to the line 58, and the raw material gas and the anode exhaust gas flow into the self sensible heat consumption section 46X of the reforming chamber 46 from the line 58. In the self sensible heat consumption section 46X, the temperature of the mixture of the raw material gas and the anode exhaust gas drops to Ti due to the reforming reaction, as shown in FIG. 12. After that, the mixture is heated at the main reforming section 46Y by the cathode exhaust gas fed from the cathode exhaust gas sensible heat utilization line 74 passing through the heating chamber 47 and the temperature of the mixture is raised to To as the reforming reaction further proceeds. The heating temperature patterns in the zone Y is the same patterns of FIG. 6. In this particular embodiment, since the anode exhaust gas is directly fed to the reforming chamber 46, the steam required for the reforming reaction is given by steam produced in the cell reaction.

The anode gas reformed through the main reforming section 46Y of the reforming chamber 46 flows in the anode gas feed line 91 and heats the natural gas at the heat exchanger 59. Thereafter, the anode gas flows in the line 91 to be pressurized by the blower 92 and to be introduced to the anode chamber 43.

In the fourth embodiment, the anode exhaust gas and the raw material gas may be directly mixed with each other and the mixture may be heated above the reforming temperature such that the reforming reaction takes place in the self sensible heat consumption zone X, in addition to the embodiment of FIG. 2. In such a case, not only the sensible heat of the cathode exhaust gas but also the sensible heat of the anode exhaust gas can be effectively used in the reforming reaction.

Figure 9:
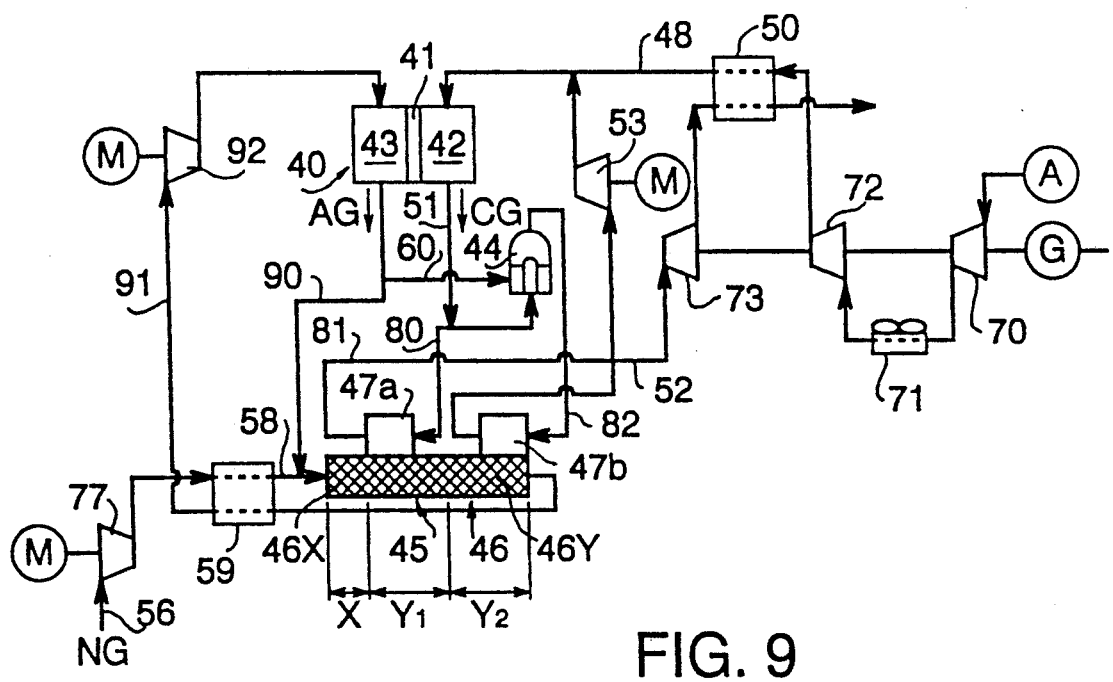
FIG. 9 is a system diagram of a sixth embodiment of the present invention.

Referring now to FIG. 9 showing the fifth embodiment of the present invention, which is the modified embodiment of the embodiment of FIG. 3, the fundamental way of gas flow is same as FIG. 3. The anode exhaust gas flows from the anode gas recirculation line 90 branched from the anode exhaust gas line 60, into the line 58, and the natural gas and the anode exhaust gas are mixed with each other therein. Then, the mixture is introduced to the self sensible heat consumption zone 46X of the reforming chamber 46. On the other hand, the anode gas reformed through the main reforming sections 46Y1 and 46Y2 flows in the anode gas feed line 91 and heats the natural gas at the heat exchanger 59. Then, the anode gas is pressurized by the blower 92 as it flows through the line 91 and then introduced to the anode chamber 43. Other structure of the system is same as FIG. 3.

Figure 13:
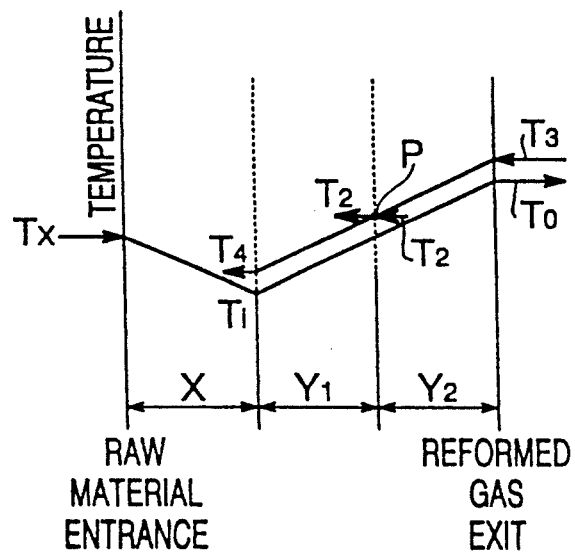
FIG. 13 shows reforming temperature patterns of the sixth embodiment.

The temperature patterns of the fifth embodiment is shown in FIG. 13. The temperature patterns are same as FIG. 7 except that the raw material gas is reformed by the sensible heat of the anode exhaust gas at the self sensible heat consumption zone X and its temperature is lowered to Ti from Tx.

Figure 10:
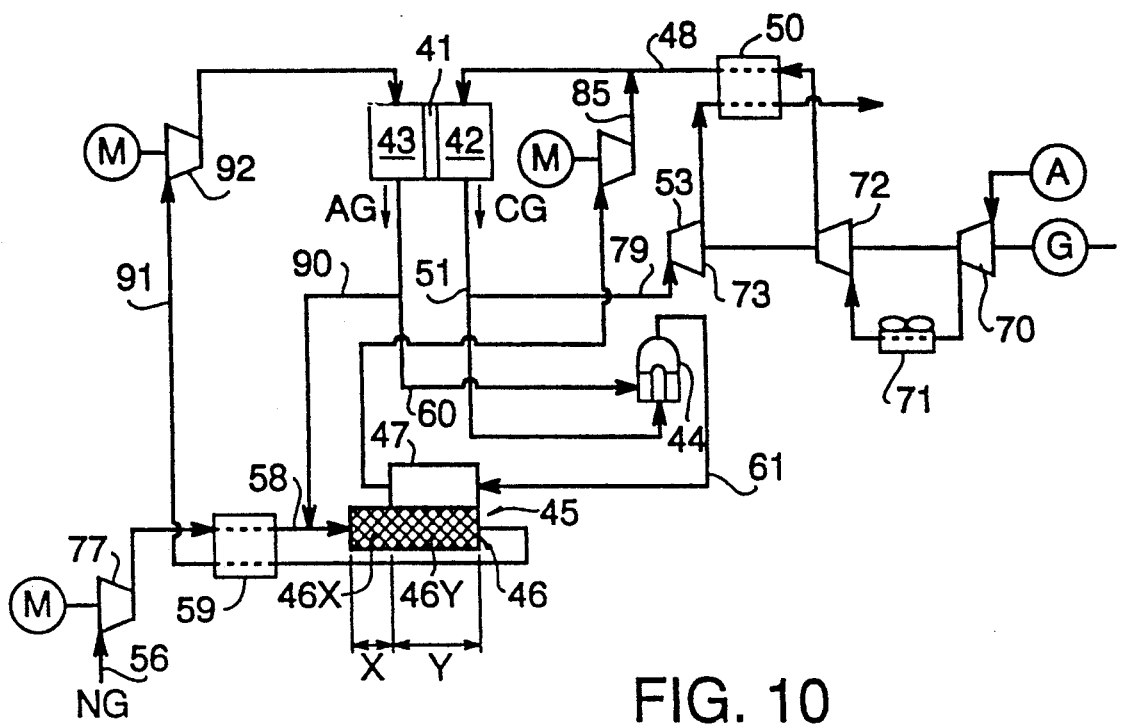
FIG. 10 is a system diagram of a seventh embodiment of the present invention.

FIG. 10 illustrates a fixth embodiment of the present invention. This is the modified version of the system of FIG. 4 and the basic manner of flow is same as FIG. 4. The anode exhaust gas flows in the line 58 from the anode gas recirculation line 90 branched from the anode exhaust gas line 60 and the natural gas and the anode exhaust gas are mixed with each othere therein. The mixture flows in the self sensible heat consumption section 46X of the reforming chamber 46. On the other hand, the anode gas reformed through the main reforming section 46Y of the reforming chamber 46 flows in the anode gas feed line 91 and heats the steam and the natural gas at the heat exchanger 59. Then, the anode gas is pressurized by the blower 92 as it proceeds in the line 91, and then it is introduced to the anode chamber 43. Other structure is same as FIG. 4.

Figure 14:
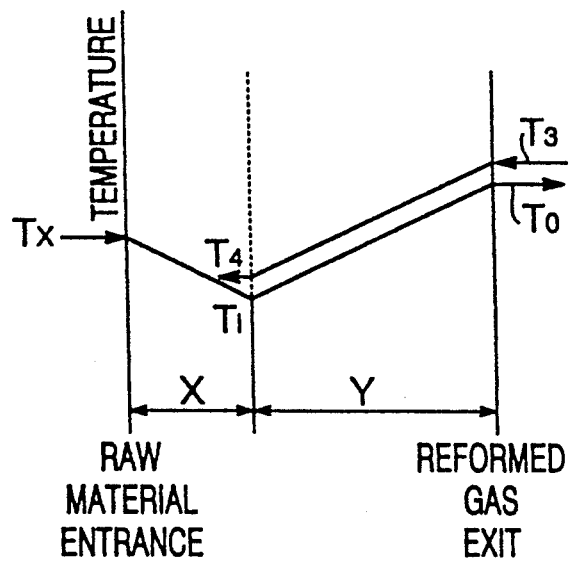
FIG. 14 shows reforming temperature patterns of the seventh embodiment.

The temperature patterns of the sixth embodiment is shown in FIG. 14 and the temperature patterns is same as FIG. 5 except for the self sensible heat consumption zone X.

Figure 11:
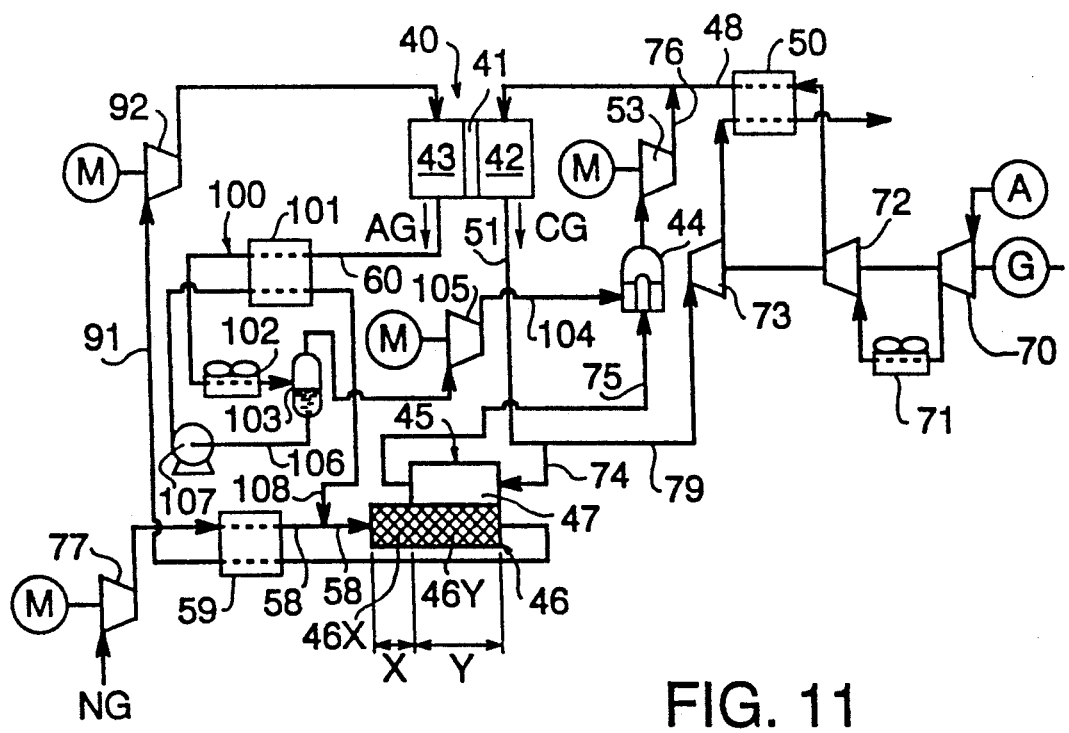
FIG. 11 is a system diagram of a eighth embodiment of the present invention.

FIG. 11 illustrates a seventh embodiment of the present invention. The way of feeding and discharging the cathode gas is same as the system of FIG. 8 (the fourth embodiment). This embodiment differs from the embodiment of FIG. 8 in that the anode exhaust gas from the anode exhaust gas line 60 is not directly fed to the combustor and the raw material gas feed line 58, but gas component and moisture component among the anode exhaust gas are separated from each other at a liquid-gas separator 100 (the separator 100 includes a vaporizer 101, a condenser 102 and a gas-liquid separating drum 103), in that the moisture component is changed to steam by the vaporizer 102 prior to flowing into the natural gas feed line 56, in that the raw material gas containing the natural gas and the steam is fed to the reforming chamber 46 from the line 58, and in that the separated gas component is fed to the combustor 44.

The gas-liquid separator 100 will be now explained. The anode exhaust gas of the anode chamber 43 is cooled by the vaporizer 101 connected with the anode exhaust gas line 60 and then condensed by the condenser 102. After that, the anode exhaust gas is introduced to the gas-liquid separating drum 103 and the gas component and the moisture component thereof are separated from each other. The gas component is fed to the combustor 44 via a blower 105 from a gas line 104 extending from a top of the drum 103 (The gas line 104 is a line downstream of the drum 103). On the other hand, the moisture component is led into a water line 106 extending from a bottom of the drum 103, and then into the steam generator 101 via a pump 107. The moisture component is converted to the steam by the anode exhaust gas and introduced to the line 58 via the steam line 108.

Apparent from the above description, the present invention has following advantages:

(1) Fuel used to heat the reformer is remarkably reduced since the high temperature cathode exit gas discharged from the cathode is fed as the heat source to the heating chamber of the reformer;

(2) Consequently, it is possible to raise the fuel utilization ratio of the fuel cell and in turn the power generation efficienty of the system;

(3) The anode exit gas and the cathode exit gas are directly introduced to the catalyst combustor and the combusible component of the anode exit gas is combusted with oxygen of the cathode exit gas, and accordingly following merits arise: (a) The oxygen concentration of the cathode exit gas is low as compared with the air so that an amount of gas to be fed increases to ensure the oxygen required for the combustion of the fuel. This means that a large amount of the sensible heat of the cathode exhaust gas is brought into the reformer and that the combustion temperature is lowered. Thus, longevities of the combustion catalyst and metallic partitions are prolonged and the reliability of the system is improved. The longevity of the combustion catalyst becomes shorter considerably if the operation temperature is unduly high; (b) The combusible component of the anode exit gas and the oxygen concentration of the cathode exit gas are relatively low. In such a case, various values of these gases are below the explosion limits so that no explosion would occur even if combustion did not take place in the catalyst combustor due to the deterioration of the catalyst or other reasons. Thus, safety is ensured. In addition, if the combustion takes place in the catalyst combustor in a normal manner, the oxygen concentration at the catalyst combustor exit is extremely low. Therefore, even if the partitions of the reformer are broken and the fuel of high concentration flows into the heating chamber, the explosion does not occur since the oxygen concetration is sufficiently low; and (c) Control of differential pressure between the anode electrode and the cathode electrode is not necessary. As a result, valves for adjusting the differential pressure, which are otherwise provided at the high temperature section, are not necessary; and (4) In the system having the self sensible heat consumption zone and the heating zone, the sensible heat of gas can be effectively used in the reformation so that the fuel for the heating is further reduced.

In the foregoing embodiments, the catalyst combustor and the reformer are illustrated as separate devices. However, the catalyst combustor may be incorporated in the reformer to provide a single element.

What is claimed is:

1. A power generation system comprising:
   molten carbonate fuel cells, each fuel cell having an anode chamber and a cathode chamber and power generation being caused by anode gas supplied to the anode chamber and cathode gas supplied to the cathode chamber;
   a reformer having a reforming section and a heating section, raw material being reformed to the anode gas by the reforming section and the reforming section being heated by the heating section;
   means for feeding raw material to be reformed, to the reforming section of the reformer;
   an anode gas feeding line for feeding the anode gas, which is the gas reformed by the reformer, into the anode chamber;
   means for feeding the cathode gas into the cathode chamber, the cathode gas including air;
   an anode exhaust gas line for discharging anode exhaust gas from the anode chamber; and
   a cathode exhaust gas line for discharging cathode exhaust gas from the cathode chamber;
   characterized in that the reformer has a reforming chamber and a heating chamber, the raw material being reformed by the reforming chamber and the reforming chamber being heated by the heating chamber; and
   the system further comprises:
   a catalyst combustor for combusting combustible components among the anode exhaust gas, the combustor being directly connected with the anode exhaust gas line and the cathode exhaust gas line, and the combustor having an exit; and
   a sensible heat utilization line for connecting the exit of the catalyst combustor with the heating chamber of the reformer for feeding exhaust gas of the catalyst combustor to the heating chamber.

2. A power generation system comprising:
   molten carbonate fuel cells, each fuel cell having an anode chamber and a cathode chamber and power generation being caused by anode gas supplied to the anode chamber and cathode gas supplied to the cathode chamber;
   a reformer having a reforming section and a heating section, raw material being reformed to the anode gas by the reforming section and the reforming section being heated by the heating section;
   means for feeding raw material to be reformed, to the reforming section of the reformer;
   an anode gas feeding line for feeding the anode gas, which is the gas reformed by the reformer, into the anode chamber;
   means for feeding the cathode gas into the cathode chamber, the cathode gas including air;
   an anode exhaust gas line for discharging anode exhaust gas from the anode chamber; and
   a cathode exhaust gas line for discharging cathode exhaust gas from the cathode chamber;
   characterized in that the reformer has a reforming chamber and a heating chamber, the raw material being reformed by the reforming chamber and the reforming chamber being heated by the heating chamber; and
   the system further comprises:
   a catalyst combustor for combusting combustible components among the anode exhaust gas, the combustor being connected with the anode exhaust gas line and the cathode exhaust gas line, and the combustor having an exit; and
   a sensible heat utilization line for connecting the exit of the catalyst combustor with the heating chamber of the reformer for feeding exhaust gas of the catalyst combustor to the heating chamber; and
   wherein the cathode gas feeding means includes:
   an air line for feeding preheated air to the cathode chamber; and
   a recirculation line branched from the cathode exhaust gas line for feeding the cathode exhaust gas to the cathode chamber via the air line.

3. The system of claim 2, wherein the air line includes an air preheater, and the cathode exhaust gas line branched from the cathode gas recirculation line is connected to the air preheater.

4. The system of claim 1, wherein the anode gas feeding line includes a heat exchanger for heat exchange with the raw material.

5. The system of claim 1, wherein a heat exchanger is provided on the anode gas feeding line, steam is generated upon heat exchange with exhaust gas discharged from the heating chamber of the reformer, the raw material includes natural gas and the steam, and the raw material feeding means leads the raw material in a manner such that the raw material is heat-exchanged with reformed gas at the heat exchanger on the anode gas feeding line and then fed to the reforming section.

6. A power generation system comprising:
   molten carbonate fuel cells, each fuel cell having an anode chamber and a cathode chamber and power generation being caused by anode gas supplied to the anode chamber and cathode gas supplied to the cathode chamber;
   a reformer having a reforming section and a heating section, raw material being reformed to the anode gas by the reforming section and the reforming section being heated by the heating section;
   means for feeding raw material to be reformed, to the reforming section of the reformer;
   an anode gas feeding line for feeding the anode gas, which is the gas reformed by the reformer, into the anode chamber;
   means for feeding the cathode gas into the cathode chamber, the cathode gas including air;
   an anode exhaust gas line for discharging anode exhaust gas from the anode chamber; and a cathode exhaust gas line for discharging cathode exhaust gas from the cathode chamber;

characterized in that the reformer has a reforming chamber and a heating chamber, the raw material being reformed by the reforming chamber and the reforming chamber being heated by the heating chamber; and the system further comprises:

a catalyst combustor for combusting combustible components among the anode exhaust gas, the combustor being connected with the anode exhaust gas line and the cathode exhaust gas line, and the combustor having an exit; and a sensible heat utilization line for connecting the exit of the catalyst combustor with the heating chamber of the reformer for feeding exhaust gas of the catalyst combustor to the heating chamber;

wherein a heat exchanger is provided on the anode gas feeding line, steam is generated upon heat exchange with exhaust gas discharged from the heating chamber of the reformer, the raw material includes natural gas and the steam, and the raw material feeding means leads the raw material in a manner such that the raw material is heat-exchanged with reformed gas at the heat exchanger on the anode gas feeding line and then fed to the reforming section; and wherein the raw material in the reforming chamber of the reformer is heated and reformed by combustion exhaust gas fed to the heating chamber from the catalyst combustor, so that an exit temperature of the heating chamber becomes lower than a cathode exhaust gas temperature and an anode exhaust gas temperature entering the catalyst combustor, and combustible components of the anode exhaust gas entering the catalyst combustor and an oxygen concentration of the cathode exhaust are both low such that a mixture of these gases is combusted without explosion.

7. A power generation system comprising:

molten carbonate fuel cells, each fuel cell having an anode chamber and a cathode chamber and power generation being caused by anode gas supplied to the anode chamber and cathode gas supplied to the cathode chamber;

a reformer having a reforming section and a heating section, raw material being reformed to the anode gas by the reforming section and the reforming section being heated by the heating section;

means for feeding raw material to be reformed, to the reforming section of the reformer;

an anode gas feeding line for feeding the anode gas, which is the gas reformed by the reformer, into the anode chamber;

an air feeding line for feeding preheated air into the cathode chamber;

an anode exhaust gas line for discharging anode exhaust gas from the anode chamber; and a cathode exhaust gas line for discharging cathode exhaust gas from the cathode chamber;

characterized in that the reformer has a reforming chamber and a heating chamber the raw material being reformed by the reforming chamber and the reforming chamber being heated by the heating chamber; and the system further comprising:

a sensible heat utilization line branched from the cathode exhaust gas line for feeding cathode exhaust gas directly to the heating chamber of the reformer;

a catalyst combustor for combusting combustible components among of the anode exhaust gas, the combustor being connected with the anode exhaust gas line and the cathode exhaust gas line of the heating chamber of the reformer, and the combustor having an exit; and a recirculation line for connecting the exit of the catalyst combustor with the air line so as to recirculate exhaust gas of the catalyst combustor to the cathode chamber.

8. The system of claim 7, wherein the air feeding line includes a compressor for pressurizing air and a preheater for preheating the pressurized air by the cathode exhaust gas, and the cathode exhaust gas recirculation gas line includes a blower.

9. The system of claim 7, wherein the anode gas feeding line includes a heat exchanger for heat exchange with the raw material.

10. The system of claim 8, wherein a heat exchanger is provided on the anode gas feeding line, steam is generated upon heat exchange with the cathode exhaust gas, the raw material includes pressurized natural gas and the steam, and the raw material feeding means leads the raw material in a manner such that the raw material is heat-exchanged with reformed gas at the heat exchanger on the anode gas feeding line and then fed to the reforming chamber.

11. The system of claim 8, wherein the raw material in the reforming chamber of the reformer is heated and reformed by sensible heat of the high temperature cathode exhaust gas fed from the cathode chamber via the sensible heat utilization line, an exit temperature of the heating chamber is introduced to the turbine, and the compressor of the air line is rotated by the rotation of the turbine.

12. A power generation system comprising:

molten carbonate fuel cells, each fuel cell having an anode chamber and a cathode chamber and power generation being caused by anode gas supplied to the anode chamber and cathode gas supplied to the cathode chamber;

a reformer having a reforming section and a heating section, raw material being reformed to the anode gas by the reforming section and the reforming section being heated by the heating section;

means for feeding raw material to be reformed, to the reforming section of the reformer;

an anode gas feeding line for feeding the anode gas, which is the gas reformed by the reformer, into the anode chamber;

an air feeding line for feeding preheated air into the cathode chamber;

an anode exhaust gas line for discharging anode exhaust gas from the anode chamber; and a cathode exhaust gas line for discharging cathode exhaust gas from the cathode chamber;

characterized in that the reformer has a reforming chamber, a first heating chamber and a second heating chamber, the raw material being reformed by the reforming chamber, the reforming chamber having a longitudinal direction, an entrance and an exit, the reforming chamber being heated by the first and second heating chambers, the first heating chamber being separated from the second heating chamber, the first and second heating chambers extending in the longitudinal direction of the reforming chamber along the reforming chamber but the first heating chamber extending from the entrance of the reforming chamber and the second heating chamber extending from the exit of the reforming chamber; and the system further comprises:

a first sensible heat utilization line branched from the cathode exhaust gas line for feeding the cathode exhaust gas to the first heating chamber of the reformer;

a catalyst combustor for combusting combusible components among the anode exhaust gas, the combustor being connected with the anode exhaust gas line and the cathode exhaust gas line, the combustor having an exit;

a second sensible heat utilization line for connecting the exit of the catalyst combustor with the second heating chamber so as to feed exhaust gas of the catalyst combustor to the second heating chamber; and a recirculation line for feeding exit gas of the second heating chamber to the cathode chamber.

13. The system of claim 12, wherein the air feeding line includes a compressor for pressurizing air and a preheater for preheating the pressurized air by the cathode exhaust gas, and the cathode exhaust gas recirculation gas line includes a blower.

14. The system of claim 12, wherein the anode gas feeding line includes a heat exchanger for heat exchange with the raw material.

15. The system of claim 14, wherein a heat exchanger is provided on the anode gas feeding line, steam is generated upon heat exchange with the cathode exhaust gas, the raw material includes pressurized natural gas and the steam, and the raw material feeding means leads the raw material in a manner such that the raw material is heat-exchanged with reformed gas at the heat exchanger on the anode gas feeding line and then fed to the reforming chamber.

16. The system of claim 15, wherein the raw material in the reforming chamber of the reformer is heated by sensible heat of the high temperature cathode exhaust gas fed to the first heating chamber from the cathode chamber via the first sensible heat utilization line and further heated and reformed by sensible heat of the high temperature cathode gas fed to the second heating chamber from the catalyst combustor via the second sensible heat utilization line, an exit gas of the first heating chamber is introduced to the turbine, and the compressor of the air line is rotated by the rotation of the turbine.

17. A power generation system comprising:

molten carbonate fuel cells, each fuel cell having an anode chamber and a cathode chamber and power generation being caused by anode gas supplied to the anode chamber and cathode gas supplied to the cathode chamber;

a reformer having a reforming section and a heating section, raw material being reformed to the anode gas by the reforming section and the reforming section being heated by the heating section;

means for feeding raw material to the reforming section of the reformer;

an anode gas feed line for feeding the anode gas, which is the gas reformed by the reformer, into the anode chamber;

an air feed line for feeding preheated air into the cathode chamber;

an anode exhaust gas line for discharging anode exhaust gas from the anode chamber; and a cathode exhaust gas line for discharging cathode exhaust gas from the cathode chamber;

characterized in that the reformer has a reforming chamber and a heating chamber, the raw material being reformed by the reforming chamber, the reforming chamber being heated by the heating chamber, the heating chamber having an exit; and the system further comprises:

a catalyst combustor for combusting combustible components among the anode exhaust gas, the combustor being connected with the anode exhaust gas line and the cathode exhaust gas line, the combustor having an exit;

a sensible heat utilization line for connecting the exit of the catalyst combustor with the heating chamber so as to feed exhaust gas of the catalyst combustor to the heating chamber; and a recirculation line for connecting the exit of the heating chamber with the air line so as to feed exhaust gas of the heating chamber to the cathode chamber.

18. The system of claim 17, wherein the air feeding line includes a compressor for pressurizing air and a preheater for preheating the pressurized air by the cathode exhaust gas, and the cathode exhaust gas recirculation gas line includes a blower.

19. The system of claim 17, wherein the anode gas feeding line includes a heat exchanger for heat exchange with the raw material.

20. The system of claim 18, wherein a heat exchanger is provided on the anode gas feeding line, steam is generated upon heat exchange with the cathode exhaust gas, the raw material includes pressurized natural gas and the steam, and the raw material feeding means leads the raw material in a manner such that the raw material is heat-exchanged with reformed gas at the heat exchanger on the anode gas feeding line and then fed to the reforming chamber.

21. The assembly of claim 20, wherein the raw material in the reforming chamber of the reformer is heated and reformed by combustion exhaust gas fed to the heating chamber from the catalyst combustor, and an exit temperature of the heating chamber becomes lower than a temperature of cathode exhaust gas and anode exhaust gas entering the catalyst combustor.

22. The system of claim 18, wherein a cathode gas heat utilization line is branched from the cathode exhaust gas line of the cathode chamber, the cathode gas heat utilization line is equipped with a turbine and an air preheater, the air preheater is also disposed on the air line, and the compressor of the air line is rotated by rotation of the turbine.

23. A power generation system comprising:

molten carbonate fuel cells, each fuel cell having an anode chamber and a cathode chamber and power generation being caused by anode gas supplied to the anode chamber and cathode gas supplied to the cathode chamber;

a reformer having a reforming section and a heating section, raw material being reformed to the anode gas by the reforming section and the reforming section being heated by the heating section;

means for feeding raw material to the reforming section of the reformer;

an anode gas feed line for feeding the anode gas, which is the gas reformed by the reformer, into the anode chamber;

an air feed line for feeding preheated air into the cathode chamber;

an anode exhaust gas line for discharging anode exhaust gas from the anode chamber; and a cathode exhaust gas line for discharging cathode exhaust gas from the cathode chamber;

characterized in that the reformer has a reforming chamber and a heating chamber, the raw material being reformed by the reforming chamber, the reforming chamber being heated by the heating chamber, the heating chamber having an exit; and the system further comprises:

a cathode gas sensible heat utilization line branched from the cathode exhaust gas line for feeding the cathode exhaust gas directly to the heating chamber of the reformer;

an anode gas recirculation line branched from the anode exhaust gas line for feeding the anode exhaust gas to the reforming chamber together with the raw material;

a catalyst combustor connected with the anode exhaust gas and the cathode exhaust gas line of the heating chamber of the reformer for combusting combustible components among the anode exhaust gas; and a recirculation line for connecting the exit of the heating chamber with the air line so as to feed exhaust gas of the catalyst combustor to the cathode chamber.

24. The system of claim 23, wherein the air feeding line includes a compressor for pressurizing air and a preheater for preheating the pressurized air by the cathode exhaust gas, and the cathode exhaust gas recirculation gas line includes a blower.

25. The system of claim 24, wherein the anode gas feeding line includes a heat exchanger for heat exchange with the raw material.

26. The system of claim 25, wherein the raw material gas feeding means leads pressurized natural gas and steam contained in the anode exhaust gas from the anode gas recirculation line, into the reforming chamber.

27. The assembly of claim 26, wherein the raw material in the reforming chamber of the reformer is mixed with and heated by the anode exhaust gas, and then heated and reformed by sensible heat of high temperature cathode exhaust gas fed into the heating chamber from the cathode chamber via the sensible heat utilization line.

28. The system of claim 24, wherein the cathode exhaust gas line is equipped with a turbine and an air preheater of the air line, and the compressor of the air line is rotated by rotation of the turbine.

29. A power generation system comprising:

molten carbonate fuel cells, each fuel cell having an anode chamber and a cathode chamber and power generation being caused by anode gas supplied to the anode chamber and cathode gas supplied to the cathode chamber;

a reformer having a reforming section and a heating section, raw material being reformed to the anode gas by the reforming section and the reforming section being heated by the heating section;

means for feeding raw material to the reforming section of the reformer;

an anode gas feed line for feeding the anode gas, which is the gas reformed by the reformer, into the anode chamber;

an air feed line for feeding preheated air into the cathode chamber;

an anode exhaust gas line for discharging anode exhaust gas from the anode chamber; and a cathode exhaust gas line for discharging cathode exhaust gas from the cathode chamber;

characterized in that the reformer has a reforming chamber, a first heating chamber and a second heating chamber, the raw material being reformed by the reforming chamber, the reforming chamber having a longitudinal direction, an entrance and an exit, the reforming chamber being heated by the first and second heating chambers, the first and second heating chambers extending in the longitudinal direction of the reforming chamber along the reforming chamber but the first heating chamber extending from the entrance of the reforming chamber and the second heating chamber extending from the exit of the reforming chamber, the first heating chamber being separated from the second heating chamber; and the system further comprises:

a first sensible heat utilization line branched from the cathode exhaust gas line for feeding the cathode exhaust gas to the first heating chamber of the reformer;

a catalyst combustor connected with the anode exhaust gas line and the cathode exhaust gas line for combusting combusible components among the anode exhaust gas, the combustor having an exit;

a second sensible heat utilization line for connecting the exit of the catalyst combustor with the second heating chamber so as to feed exhaust gas of the catalyst combustor to the second heating chamber;

a recirculation line for feeding exit gas of the second heating chamber to the cathode chamber; and a third anode gas recirculation line branched from the anode exhaust gas line for feeding the anode exhaust gas to the reforming chamber together with the raw material.

30. The system of claim 29, wherein the air feeding line includes a compressor for pressurizing air and a preheater for preheating the pressurized air by the cathode exhaust gas, and the cathode exhaust gas recirculation gas line includes a blower.

31. The system of claim 30, wherein the anode gas feeding line includes a heat exchanger for heat exchange with the raw material.

32. The system of claim 31, wherein the raw material feeding means leads pressurized natural gas and steam among the anode exhaust gas into the reforming section, and the gas after the reformation is used to preheat the natural gas.

33. The system of claim 32, wherein the raw material in the reforming chamber of the reformer is mixed with and heated by the anode exhaust gas fed from the third anode gas sensible heat utilization line, heated by sensible heat of the high temperature cathode exhaust gas fed to the first heating chamber from the cathode chamber via the first sensible heat utilization line and further heated and reformed by sensible heat of high temperature exhaust gas fed to the second heating chamber from the catalyst combustor via the second sensible heat utilization line, an exit gas of the first heating chamber is introduced to the turbine, and the compressor of the air line is rotated by the rotation of the turbine.

34. A power generation system comprising:
molten carbonate fuel cells, each fuel cell having an anode chamber and a cathode chamber and power generation being caused by anode gas supplied to the anode chamber and cathode gas supplied to the cathode chamber;
a reformer having a reforming section and a heating section, raw material being reformed to the anode gas by the reforming section and the reforming section being heated by the heating section;
means for feeding raw material to the reforming section of the reformer;
an anode gas feed line for feeding the anode gas, which is the gas reformed by the reformer, into the anode chamber;
an air feed line for feeding preheated air into the cathode chamber;
an anode exhaust gas line for discharging anode exhaust gas from the anode chamber; and
a cathode exhaust gas line for discharging cathode exhaust gas from the cathode chamber;
characterized in that the reformer has a reforming chamber and a heating chamber, the raw material being reformed by the reforming chamber, the reforming chamber being heated by the heating chamber, the heating chamber having an exit; and the system further comprises:
a catalyst combustor connected with the anode exhaust gas line and the cathode exhaust gas line for combusting combustible components among the anode exhaust gas, the combustor having an exit;
a first exhaust gas sensible heat utilization line for connecting the exit of the catalyst combustor with the heating chamber of the reformer so as to feed exhaust gas of the catalyst combustor to the heating chamber;
a recirculation line for connecting the exit of the heating chamber with the air line so as to feed exhaust gas of the heating chamber to the cathode chamber; and
a second anode gas recirculation line branched from the anode exhaust gas line for feeding the anode exhaust gas to the reforming chamber together with the raw material.

35. The system of claim 34, wherein the air feeding line includes a compressor for pressurizing air and a preheater for preheating the pressurized air by the cathode exhaust gas, and the cathode exhaust gas recirculation gas line includes a blower.

36. The system of claim 35, wherein the anode gas feeding line includes a heat exchanger for heat exchange with the raw material.

37. The system of claim 31, wherein the raw material feeding means leads the raw material including pressurized natural gas and steam among the anode exhaust gas, into the reforming chamber, and the gas after the reformation and the natural gas are heat-exchanged with each other.

38. The assembly of claim 37, wherein the raw material in the reforming chamber of the reformer is mixed with and heated by the anode exhaust gas fed from the second anode gas sensible heat utilization line and further heated and reformed by sensible heat of combustion exhaust gas fed to the heating chamber from the catalyst combustor.

39. The system of claim 38, wherein a cathode gas heat utilization line is branched from the cathode exhaust gas line of the cathode chamber, the cathode gas heat utilization line is equipped with a turbine and an air preheater, the air preheater is also disposed on the air line, and the compressor of the air line is rotated by rotation of the turbine.

40. A power generation system comprising:
molten carbonate fuel cells, each fuel cell having an anode chamber and a cathode chamber and power generation being caused by anode gas supplied to the anode chamber and cathode gas supplied to the cathode chamber;
a reformer having a reforming section and a heating section, raw material being reformed to the anode gas by the reforming section and the reforming section being heated by the heating section;
means for feeding natural gas to the reforming section of the reformer;
an anode gas feed line for feeding the anode gas, which is the gas reformed by the reformer, into the anode chamber;
an air feed line for feeding preheated air into the cathode chamber;
an anode exhaust gas line for discharging anode exhaust gas from the anode chamber; and
a cathode exhaust gas line for discharging cathode exhaust gas from the cathode chamber;
characterized in that the reformer has a reforming chamber and a heating chamber, the raw material being reformed by the reforming chamber, the reforming chamber being heated by the heating chamber, the heating chamber having an exit; and the system further comprises:
a first cathode gas sensible heat utilization line branched from the cathode exhaust gas line for feeding the cathode exhaust gas directly to the heating chamber of the reformer;
a gas-liquid separating means connected with the anode exhaust gas line for separating gas components of the anode exhaust gas from moisture components of the anose exhaust gas;
a second sensible heat utilization line for heating the moisture components separated by the gas-liquid separating means, by the anode exhaust gas of the anode exhaust gas line so as to change the moisture to steam and further for feeding the steam with natural gas as the raw material to the reforming chamber;
a catalyst combustor for introducing to itself the gas components separated by the gas-liquid separator and the cathode exhaust gas of the heating chamber of the reformer so as to combust combusible combusible components among this mixture of gases; and
a recirculation line for connecting the exit of the catalyst combustor with the air line so as to feed exhaust gas of the catalyst combustor to the cathode chamber.

41. The system of claim 40, wherein the air feeding line includes a compressor for pressurizing air and a preheater for preheating the pressurized air by the cathode exhaust gas, and the cathode exhaust gas recirculation gas line includes a blower.

42. The system of claim 41, wherein the anode gas feeding line includes a heat exchanger for heat exchange between the natural gas and the reformed anode gas.

43. The system of claim 42, wherein the gas-liquid separating means includes:
- a separation drum for separating gas from liquid, the separation drum having an upper gas exit and a lower portion; and
- a heat exchanger for heat exchange between the anode exhaust gas from the anode chamber and the moisture separated by the separation drum so as to cool the anode exhaust gas and to heat the moisture.

44. The assembly of claim 43, wherein the upper gas exit of the separation drum is connected with the catalyst combustor and a blower is provided between the upper gas exit of the separation drum and the catalyst combustor.

45. The system of claim 44, wherein water in the lower portion of the separation drum is transferred to the heat exchanger by a pump and heated to steam by the anode exhaust gas passing through the heat exchanger, the steam is introduced to the natural gas feed line through the second sensible heat utilization line such that the natural gas and the steam are fed to the reforming chamber as the raw material.

46. The assembly of claim 45, wherein the raw material fed to the reforming chamber is heated and reformed by sensible heat of the high temperature cathode exhaust gas fed to the heating chamber from the cathode chamber via the sensible heat utilization line.

47. The system of claim 46, wherein the cathode exhaust gas line is connected to the preheater of the air line and the turbine, and the compressor of the air line is rotated by rotation of the turbine.

* * * * *